C. BRUNO.
SPRINGING SUSPENSION DEVICE FOR CYCLES.
APPLICATION FILED APR. 5, 1913.
1,412,012.
Patented Apr. 4, 1922.
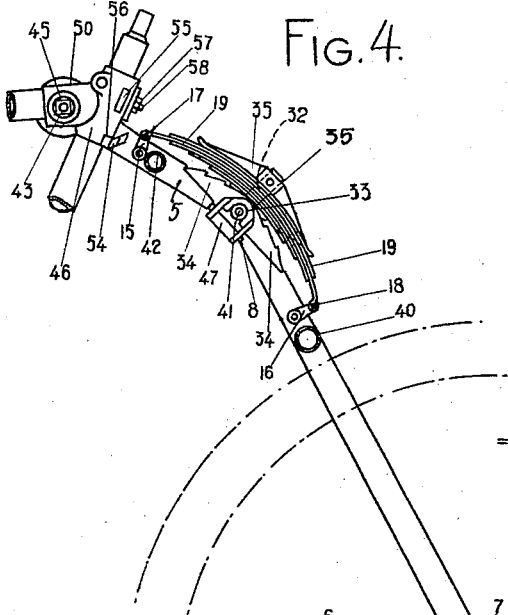

UNITED STATES PATENT OFFICE.

CARLO BRUNO, OF TURIN, ITALY.

SPRINGING SUSPENSION DEVICE FOR CYCLES.

1,412,012.  Specification of Letters Patent.  Patented Apr. 4, 1922.

Application filed April 5, 1913. Serial No. 759,098.

(GRANTED UNDER THE PROVISIONS OF THE ACT OF MARCH 3, 1921, 41 STAT. L., 1313).

*To all whom it may concern:*

Be it known that I, CARLO BRUNO, engineer, of Turin, Italy, have invented certain new and useful Improvements in Springing Suspension Devices for Cycles, (for which I have filed an application in Italy April 6, 1912,) of which the following is a full, clear, and exact specification.

The invention relates to elastic suspension devices for bicycles, motorcycles, and the like, whose front and rear forks are made up of two parts of suitable length, the parts being pivotally connected and subjected to the action of a leaf spring.

Elastic suspension devices are already known which in addition to the mentioned parts, are provided with counter-springs which exert a braking action upon the retrogressive movement of said leaf spring.

The principal object of this invention consists therein, to provide a member with a rolling surface of suitable curvature bearing upon said leaf spring, such that an increasing resistance is offered in proportion to the increase of the forces which tend to turn one of the parts of the forks with relation to the other.

Another object of the invention is to provide a similar member with a rolling surface of suitable curvature for said counter-spring, whereby a braking action with increasing energy upon the retrogressive movement of the leaf spring is obtained.

Other objects will become more apparent by reference to the drawings, the specification and the claims forming part thereof.

One preferred embodiment of the invention is indicated in the drawings, in which—

Fig. 1 is a diagrammatic illustration of a bicycle to which the principle of the invention has been applied.

Fig. 2 is a sectional plan and

Fig. 3 an elevational view of a practical embodiment of the invention as applied to the front fork of a bicycle.

Fig. 4 is an elevational view of the rear fork of a bicycle equipped with an elastic suspension device.

With reference to Fig. 1, the front fork is shown as comprising the parts 1—2 and 2—3, pivoted at 2 so that the front wheel 4, in rising into position 4' indicated in dotted lines in Fig. 1, under the influence of a jolt, causes the fork to assume the position 1—2—3'. The rear portion of the frame is composed of the four parts forming the quadrilateral figure 5—6—7—8. These parts are also pivotally connected with each other. In one of these pivotal connections the rear wheel 9 is fitted such that, as it rises into the position 9', the quadrilateral figure is deformed to 5—6—7'—8'. In order to counteract the forces which tend to raise the wheels, whereby the parts of the fork are turned with respect to each other, a resistance in the form of a spring is applied to the pivotal joint of the parts of the forks, such that the turning movement of one of the parts is resiliently opposed by the spring which shunts the pivotal connection of the parts.

In Figs. 2 and 3 a practical embodiment is illustrated as applied to the front fork of a bicycle, motorcycle, or the like. The front fork comprises the relatively long part 1 and the shorter part 3, which latter is provided at one of its extremities with an integral pivot-pin 2, which enters the hub 28 formed on the long part 1 of the front fork. The other extremity of the part 3 is formed into a hub 42 having a square aperture in which the square end 31 of a hollow spindle is fitted. (This spindle has not been shown in Fig. 3 for the sake of clearness). By means of the bolt 29 which passes through the axial hole in spindle 30, the rods or parts 3—3 at both sides of the wheel and the spindle 30 are firmly connected together. The spindle 30 thus acts as a spacing member and insures the centered position of the wheel, even when lifted. To the part 1 a small link 15 is pivotally connected, and a similar link 16 is pivotally connected to the hub 42, of the part 3. A spring 19, composed of a plurality of leaves of varying length, is pivotally connected with its rounded-off extremities to the free ends of the links 15, 16, whereby a relative distortion of the parts 1 and 3 is resisted and these parts are returned to normal position when the distorting force ceases. The hub 28 is surrounded on its inner end by a ring 33, and an extension 32 of this ring enters a hole provided in the center of the spring 19, while two ribs 34, extending from the ring 33, have rolling surfaces upon which the inner surface of the spring 19 bears. Upon the leaf spring counter-leaves of appropriate curvature are placed for the purpose of creating a resistance which resiliently brakes the spring on its return to normal position which, consequently, does not take place abruptly. The leaves of this counter-spring are held together by the extension 32 securely held upon the ring 33 by means of the cap 35 mounted upon the extension 32 and secured thereto in any suitable manner, preferably by means of a pin. The cap 35 also serves by means of ribs of appropriate form to maintain the spring in an appropriate initial condition and of graduating the resilient braking and stopping effects.

In Fig. 4 the suspension device is shown applied to the rear fork of a bicycle. The horizontal tubes 6, equivalent to the part 6—7 shown in Fig. 1, are pivotally connected to the inclined tubes 7 which, in turn, are pivotally connected by the bolt 41 to the part 5. In this instance the leaf spring 19 is also pivotally connected with its extremities 17, 18 to links 15, 16, respectively, which are pivotally secured to the parts 5, 7 of the rear fork. In this manner the leaf spring 19 is fulcrumed to the pivotal connection of the parts 5, 7 and any turning movement of the part 7 with respect to the part 5 is effectively and resiliently opposed by said leaf spring. The pivot pin 41 is surrounded by the ring 33 while an extension 32, as in the case for the front fork, penetrates a central aperture in the leaf spring. A counter-spring is also provided bearing on the leaf spring and is held in place by a cap 35 having ribs with suitable rolling surfaces adapted to engage the counter-spring upon the return of the leaf spring to its normal position.

From the foregoing it is evident that under the influence of an increasing force the spring will engage with an increasing length the rolling surface of the rib 34, so that a constantly decreasing length of the spring will remain free and a braking effect upon the oscillation of the spring is obtained. Upon the retrogressive movement of the spring, when it returns to normal position, a counter-spring is brought into play which effects a braking action upon the leaf spring, and member 35, similar to rib 34, is provided with suitable rolling surfaces so that with increasing force the braking power is correspondingly increased and the oscillations of the spring are effectively avoided.

I am aware that various changes in the arrangement of the parts and their structural form may be made without departing from the spirit and scope of the invention, and I want to avail myself of all such departures which come under the scope of the invention, as pointed out in the appended claims.

I claim:

1. An elastic suspension device for bicycles, motorcycles, and the like, comprising in combination a fork composed of two parts pivotally connected with each other, a leaf spring having its extremities pivotally connected to said parts and fulcrumed to the pivotal connection thereof, and means engaging said leaf spring to decrease its operative length in proportion to the forces tending to turn one of said parts with respect to the other.

2. An elastic suspension device for bicycles, motorcycles, and the like, comprising in combination a fork composed of two parts pivotally connected with each other, a leaf spring having its extremities pivotally connected to said parts and fulcrumed to the pivotal connection thereof, means engaging said leaf spring to decrease its operative length in proportion to the forces tending to turn one of said parts with respect to the other, a counter-spring adapted to exert a braking action upon the leaf spring on its retrogressive movement, and means for increasing said braking action.

3. An elastic suspension device for bicycles, motorcycles, and the like, comprising in combination a fork composed of two parts pivotally connected with each other, a leaf spring having its extremities pivotally connected to said parts and fulcrumed to the pivotal connection thereof, and a member provided with a rolling surface of suitable curvature engaging said leaf spring such that the power of said spring is increased in proportion to the forces tending to shift one of said parts in relation to the other.

4. An elastic suspension device for bicycles, motorcycles, and the like, comprising in combination a fork composed of two parts pivotally connected with each other, a leaf spring having its extremities pivotally connected to said parts and fulcrumed to the pivotal connection thereof, and a ribbed plate member provided with a rolling surface of suitable curvature engaging said leaf spring such that the operative length of the spring is decreased in proportion to the forces tending to turn one of said parts with respect to the other.

5. An elastic suspension device for bicycles, motorcycles, and the like, comprising in combination a fork composed of two parts pivotally connected with each other, a leaf spring having its extremities pivotally connected to said parts and fulcrumed to the pivotal connection thereof, a ribbed plate member provided with a rolling surface of suitable curvature engaging said leaf spring such that the power of said spring is increased in proportion to the forces tending to turn one of said parts with respect to the other, a counter-spring adapted to exert a braking action upon the leaf spring on its retrogressive movement, and a ribbed plate member against which the counter-spring is adapted to bear, the area of contact between the counter-spring and the last named plate member being varied through the return movement of said leaf spring to normal position.

In witness whereof, I have hereunto signed my name in the presence of two subscribing witnesses.

CARLO BRUNO.

Witnesses:
 FELICE BAZETTA,
 JOCELYN GOUBEYRAN.